July 3, 1923.
G. JOANNES
1,460,909
TEMPERATURE INDICATING DEVICE
Filed July 26, 1921
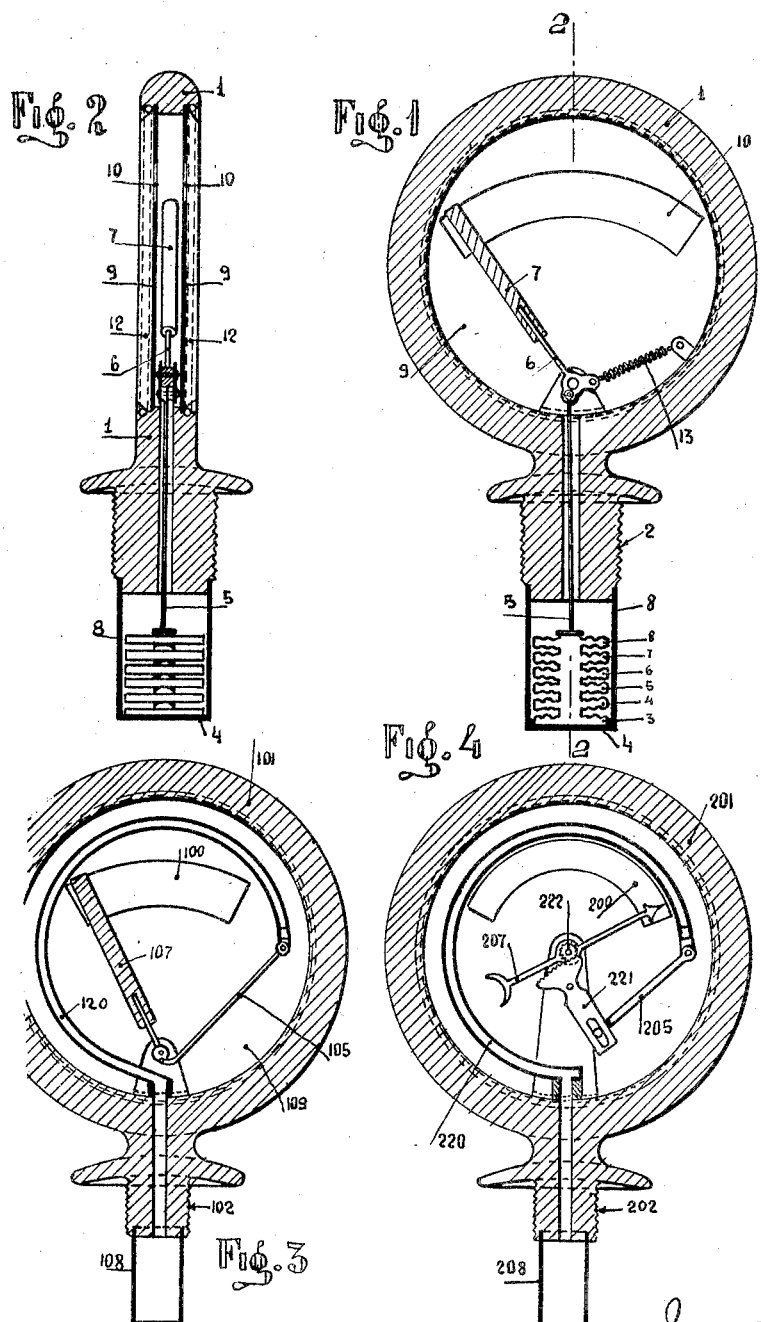
Inventor
Giuseppe Joannes Patented July 3, 1923.

1,460,909

UNITED STATES PATENT OFFICE.

GIUSEPPE JOANNES, OF TURIN, ITALY.

TEMPERATURE-INDICATING DEVICE.

Application filed July 26, 1921. Serial No. 487,737.

*To all whom it may concern:*

Be it known that I, GIUSEPPE JOANNES, a subject of the King of Italy, and resident of 23 Corso Orbassano, Turin, in the Kingdom of Italy, have invented certain new and useful Improvements in Temperature-Indicating Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a new indicating apparatus of the temperature of the water circulating in the radiator of the engines of motor cars, aeroplanes, and other motor vehicles, situated on the radiator cap, in such a way that the indicating means may be clearly seen by the driver of the vehicle, although the device is necessarily situated at a certain distance from the latter.

This apparatus consists chiefly of a tight closed receptacle which is placed (in the apparatus ready for use) within the radiator and acquiring therefore the temperature of this latter, in said receptacle being disposed a series of barometric chambers, containing air, whose deformation is transmitted to a pointer movable on a dial placed in an outer box and which may be easily seen by the driver. Instead of the barometric chambers a barometric tube may be placed in the dial chamber and set into communication with the air (or other gas) contained in the cap; in this case also the variations of the temperature of the radiator will produce corresponding changes in pressure within the barometric tube, the deformations of which will be conveniently multiplied and transmitted to the pointer.

The apparatus preferably consists of a box (which may be in the form of a disc or lens) closed by glasses and internally provided with a dial having a curved slot through which the pointer may be seen, preferably made of glass or transparent celluloid of a brilliant colour in order to be clearly seen on the black background of the dial and on the luminous one of the slot.

The device actuating the pointer consists either of a barometric tube, or preferably, of a series of barometric boxes.

In the annexed drawings is diagrammatically shown, by way of example, a constructional form of the apparatus forming the object of this invention, actuated by barometric boxes, and two modified forms actuated by a barometric tube.

Fig. 1 is a front section of the first constructional form.

Fig. 2 is a section thereof on line 2—2 of Fig. 1.

Figs. 3 and 4 are front sections of two modified forms actuated by a barometric tube.

The metal annular frame 1 terminates at its lower end with a threaded plug 2 which is screwed on the radiator filling hole; to this plug is welded a metal receptacle 8, which, in the apparatus ready for use, is located within the radiator. The receptacle 8 is tightly closed and contains a series of barometric boxes containing air or other gases, the first of which, 3, has its lower half cut away, the edges being welded to the receptacle bottom.

The pressure in the barometric boxes will be raised or lowered according to the variations of the temperature within the radiator and will produce the raising or the lowering of the series of barometric boxes on the receptacle bottom. This movement is transmitted through the rod 5 to the crank 6, to which is secured the pointer 7, preferably made of coloured glass, which is displaced in the frame 1 between two discs 9 (preferably painted in black) provided with a curved slot 10 allowing the pointer to be seen through the glass. On the discs 9 are impressed the necessary indications and reference characters.

The crystals 12 secured to the frame 1 close the upper outer box of the apparatus ensuring a tight joint.

The pointer is provided with a return spring 13 suitably secured to the frame.

In the modified form shown in Fig. 3, the expanded air in the receptacle 108 acts upon a barometric tube 120, located between the two discs 109 and actuating through a connecting rod 105 a pointer 107.

In the modified form of Fig. 4, provided with a barometric tube 220, located between the discs 109, the connecting rod 205 acts upon a sector 221 actuating through the ratchet wheel 222, the pointer 207.

Claims:

1. A temperature indicating device for automobile radiators and the like, comprising a radiator plug, an annular dial frame thereon, discs mounted in the frame having curved sight slots therein, a pointer pivoted in the frame between the discs, a closed gas receptacle on the plug, and means operated by the expansion of gas in the receptacle to oscillate the pointer.

2. A temperature indicating device for automobile radiators and the like, comprising a threaded plug for the radiator opening, an annular dial frame thereon, discs mounted in the frame having arcuate sight slots therein, a pointer pivoted in the frame between the discs, a closed gas receptacle mounted on the bottom of said plug, a barometric tube mounted in the frame between the discs and communicating with the closed gas receptacle, and mechanism connecting the tube and pointer adapted to move the end of the latter along the sight slots by expansion and contraction of gas in the receptacle.

In testimony that I claim the foregoing as my invention, I have signed my name.

GIUSEPPE JOANNES.